United States Patent [19]
LeBleu et al.

[11] Patent Number: 5,669,221
[45] Date of Patent: Sep. 23, 1997

[54] PORTABLE, POTABLE WATER RECOVERY AND DISPENSING APPARATUS

[75] Inventors: Terry L. LeBleu, San Antonio; Francis C. Forsberg, Boerne, both of Tex.

[73] Assignee: Worldwide Water, Inc., Boerne, Tex.

[21] Appl. No.: 629,305

[22] Filed: Apr. 8, 1996

[51] Int. Cl.⁶ .................................................. F25D 17/06
[52] U.S. Cl. ........................... 62/92; 62/150; 62/272; 62/285
[58] Field of Search ............................. 62/272, 285, 288, 62/290, 291, 125, 126, 129, 150, 92

[56] References Cited

U.S. PATENT DOCUMENTS

| | | | |
|---|---|---|---|
| 5,106,512 | 4/1992 | Reidy | 62/272 |
| 5,517,829 | 5/1996 | Michael | 62/272 |

OTHER PUBLICATIONS

USEPA–Drinking Water Standards–Published by NSF; Ann Arbor, MI pp. 32–34 & cover sheets of NSF Publication.

*Primary Examiner*—John M. Sollecito
*Attorney, Agent, or Firm*—M. Conrad Huffstutler

[57] ABSTRACT

A portable, potable-water generator for producing high-purity liquid water by condensation of dew from ambient air. The generator employs filtration subsystems to remove particulates and aerosols from the incoming air. An enclosed heat absorber cools the filtered air to its dew point and collects droplets of condensate into a closed system. The collected dew is further continually treated in a bacteriostat loop to destroy adventitious living organisms and to filter out undesirable and dangerous contaminants. All the subsystems are failsafe-interlocked to disable the generator immediately and prevent delivery of water if any one of them stops functioning within predetermined safe limits.

6 Claims, 11 Drawing Sheets

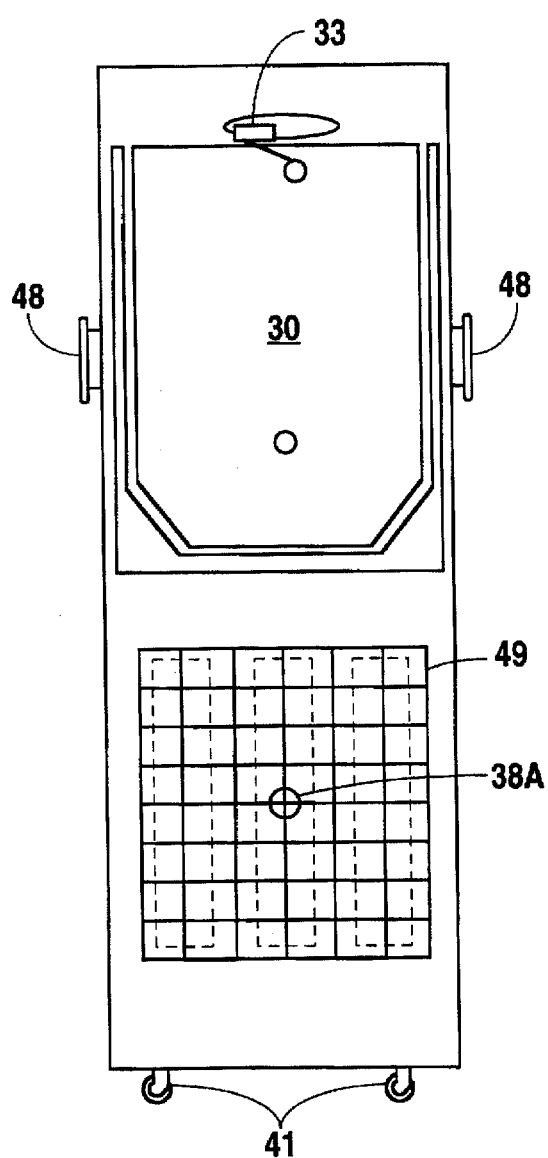
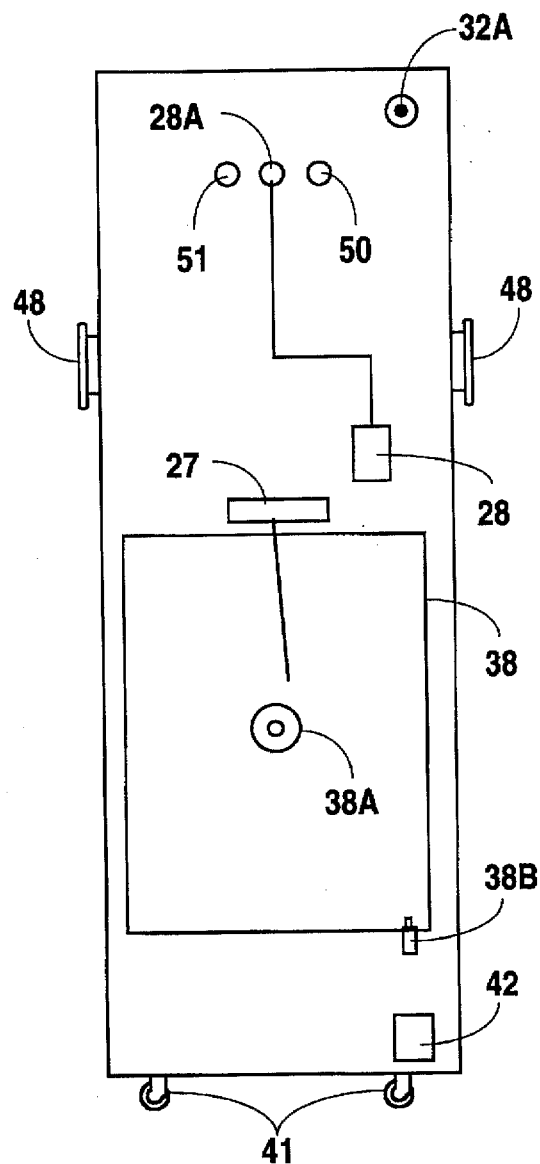
Fig. 3
Fig. 4

PORTABLE, POTABLE WATER RECOVERY AND DISPENSING APPARATUS

FIELD OF INVENTION

This invention relates to a portable, potable water dispenser capable of recovering liquid water for human use from the humidity of environmental air and sanitizing it for human use. The water generator of this invention draws in moisture-laden air from the surroundings and recovers liquid water by cooling the stream of air below its dew point. The unit can be powered from mains or portable generators, AC, 110–220 V, 50–60 Hz, or from DC power, 6–60 V batteries, or portable generator. The apparatus includes air filters which remove suspended pollen or dust particles so that contaminants and undesirable impurities from the environmental air are not carried into the dew-forming section. The apparatus also includes optional heating, cooling, filtration and sterilization systems which provide purified liquid water at multiple, different temperatures. The external envelope of the present apparatus is a compact, attractive, wheeled design and is adapted to prevent entry of insects. The water generator subsystems employ ruggedized design and construction and are intended to operate untended for extended periods in harsh, military-type environments such as peace-keeping actions, fires, earthquakes and weather disasters/emergencies.

BACKGROUND OF THE INVENTION

The consensus of most medical experts is that the water supply is the single most critical factor to human health. Over 400,000 people were stricken, 4,000 hospitalized and over 100 people died in Milwaukee in 1993 from Cryptosporidium, a bacterial contaminant in their city-treated drinking water. Natural Resources Defense Council estimates that in the U.S. alone more than 900,000 become ill each year from water-borne disease and as many as 900 will die. There is also an increasing awareness that "bottled water" itself may be no safer than municipally treated water. Some citizens feel protected by household-type water filters. However, of the over 2,000 types/styles/sizes of filters now being sold to the public for additional treating of city water, only a few remove significant amounts of parasites, viruses, bacteria, pesticides and heavy metals. While contaminated water is harmful to adults, infants and young children are at much greater risk from drinking impure water, particularly water with high levels of heavy metals or radioisotopes.

While the situation is bad in parts of the United States, it is worse in many other developed countries and absolutely frightening in third-world countries. In developing nations, there is often at least intermittent electricity but no source for potable, or human drinking water. For clinics and hospitals in such remote areas, doctors and technicians need purified water to scrub with and to prepare medicines. In the case of remote villages in developing countries, there is a need for a unit to generate and dispenses purified water, is easily moved, is relatively inexpensive to manufacture, that can operate from a variety of different types of electrical power with a minimum of maintenance over extended periods in a harsh environment.

The most common potable water dispenser for use in the home and office is the 20-liter glass or plastic bottle placed on a gravity-flow dispensing stand. The bottles usually provide processed spring or well water and are generally sold with a representation of compliance with state and local codes for potable water. One major drawback to "bottled water" is the fact that filled containers are heavy, approx. 25–30 Kg, and awkward to change. Another problem is that algae can build up in the stand; this necessitates periodic cleaning to maintain water safety. Relative to dissolved and suspended contaminants and undesired impurities, "bottled water" may be no safer than municipal supplied water. At this time, the USA market for portable, potable water sources requires: (a) generation of high-quality water which is certifiably free of all impurities which are health hazards even to infants and children, (b) no necessity for storing and moving heavy bottles, (c) no requirement for expensive, complex maintenance procedures/cleaning, (d) low operating cost, (e) no special wiring/plumbing for installation and (f) attractive, office-furniture styling.

Relevant Publications

Current EPA standards for impurities in primary and secondary drinking water are included as p. 32–34 of the publication, "Drinking Water Treatment Units Certified by NSF International", NSF International, Ann Arbor, Mich. (1995). These 1995 drinking water-standards of U.S. Environmental Protection Agency included by reference.

There are 4 U.S. patents which disclose reverse-cycle refrigeration as the cooling means for a water generator:

U.S. Pat. No. 5,149,446, issued January 1991, to J J Reidy, Reidy-446;

U.S. Pat. No. 5,106,512, issued April 1991 to J J Reidy, Reidy-512;

U.S. Pat. No. 5,259,203, issued November 1993 to D R Engel et al, Engle-203; and U.S. Pat. No. 5,301,516, issued April 1994 to F Poindexter, Poindexter-516.

None of the water generators disclosed in these publications are designed primarily as a dispenser and, none are designed as portable units.

None of these publications disclose the following features or embodiments:

Compact, wheeled, office-equipment housing

Integral, external fluid-delivery valves and controls

Ion generator for discharged air stream

Insect-resistant port covers/screens, access doors, edge joints

Ultrasonic pest deterrent

Ozone generator for water sterilization treatment

Handle grips for easy movement by lifting or rolling

Medical/food-handling-type tubing and joints for water handling subsystems

Chemically-inert, thermally-conductive dew-collector surface coatings

Working fluids in heat absorbers which comply with all current DOE, EPA and ASHRAE standards/regulations Ruggedized, long-life components and sub-systems Safe, convenient dispensing height for hot or cold water Electrostatic air filter with whistle alarm for blocked condition Attached liquid container dispenser Night lights for controls and delivery valves for low-light situations.

Air-heating strip and fan instead of hot-gas bypass circuit on compressor.

The 4 publications noted above disclose industrial water-condensation units designed to be permanently-attached to building air ducts Reidy-512 discloses a fixed-position, large-volume, high-rate water generator suitable for supplying drinking water to an entire office building, laundry, etc. The device is described as "having ducts for bringing this supply of ambient air to the device and for releasing the air back outside the device after it has been processed". The attached, permanent "ductwork" is characterized further as "extending through an outside wall of the structure or dwelling". While sensors, indicators, interlocks, alarms for the UV lamps, air filters and water filters are mentioned briefly in Reidy-512, other major components of the apparatus are usually characterized by single-word descriptions such as "air filter element", "evaporator coils", "condenser coils", etc.

In both of Reidy's patents, the drain is located on the base of his water generator, a position which makes the drains completely unsuitable for dispensing water unless the machine is placed on legs or mounted in a cabinet. Reidy-512 teaches two passes of water past ultraviolet light to kill bacteria whereas the present apparatus provides for automatic, continuous recirculation of the water in the final delivery reservoir through a UV bacteriostat zone. Reidy-512 has a number of additional limitations and shortcomings: the users must set the humidistat and thermostat. Reidy makes no provision for insect proofing the cabinet. The water filter is located under the collection pan and severely limited in both flow rate and minimum pore size by the gravity-feed pressure head. In the present apparatus, water flows through a filter is under pressure from a pump; this allows for high rates and small-pore, filter-absorption media such as a porous carbon block.

Poindexter-516 has no germicidal light nor a remote collection diverter valve. A drain is shown in FIG. 2 but none on FIG. 1. The drain is shown on the bottom of the apparatus which, if on the floor, is essentially inoperable and, if raised on a stand, makes a top-heavy unit which would require permanent wall anchors.

Engle-203 is essentially two tandem dehumidifiers. A second-stage compressor with its condenser coil immersed in the storage tank produces heated water. One familiar with the art realizes that such heated water would never reach 75 C. as does the heated water in the present apparatus.

A further problem of locating the condenser coil in the storage tank is that it prevents removal of the tank for cleaning without opening the refrigerant system. Stiff further maintenance problems arise from the positioning of drains, i.e., there are no external dispensing valves and the drain valves are poorly located for replacing the valves because of the limited access inherent in their location. Poindexter-516 claims a stainless-steel cooling coil and collection pan which adds significantly to the cost of manufacturing and does not specify the specific type of stainless steel, 314L, which is required for water handling in production facilities. The specification goes into great detail on the types of chemicals to clean areas which contact the water. In the present apparatus, the storage containers are completely removable and the condensate is sanitized by passing under the germicidal light more than several times.

All the prior patents cited above use a typical refrigerant deicer system to keep their evaporators from freezing under low condensate flow rates which can occur with cool ambient air. For example, on sheet 5 of the Reidy-512 patent is an illustration that shows water production stopping at about 10 C. This limitation occurs because obtaining condensate is inefficient and less cost effective at such low temperatures and the evaporator tends to freeze over at lower temperatures. This limitation also occurs because of the design of the water generating device using a typical hot-gas bypass deicer. All of the devices cited are large-capacity refrigerant gas dehumidifiers.

The refrigerant gas from the compressor cools an evaporator coil and when ambient air is passed by the coil, moisture condenses out and drips to a collector below. When operated over extended periods or in cooler temperatures, the evaporator freezes over due to low flow rate of condensate; in this situation, the compressor is designed switch over to hot-gas bypass mode. A thermostat and/or humidistat control assists in determining when the compressor switches over. This on/off cycle during cooler temperatures drastically reduces production of water until the compressor eventually stops when temperature of incoming air is too cold.

SUMMARY OF THE INVENTION

For the present apparatus, it is critical to be able to operate for long periods without human adjustments. Rather than have the heat absorber cycle off/on and wait for the dew-forming surface to defrost when operating in cooler temperatures, a heat strip and additional fan is designed into the heat-absorber systems of the present apparatus.

When the dew-forming surface is about to start freezing, the air-heating strip is switched on and heat absorber 1 continues to run, and water production is not interrupted. As a further benefit, the incoming ambient air is warmed; generally, the warmer the ambient air, the more moisture that can be extracted from it. The heating strip also protects the apparatus, including collection reservoirs, from sudden unexpected freezing when ambient air drops below 0 deg C.

The resistance-heating strip and fan, rather than a hot-gas bypass valve, distinguishes the present invention from the other devices.

The water generator of the present invention operates within a closed housing and water dispensing subsystems deliver directly to the external dispensing valve. It is not necessary to open the housing every time a small quantity of water is desired. The housing panels and various openings of the present invention are fitted with tight-sealing flanges to prevent insect infestation and contamination of the water. Any dispenser that is designed to work in remote, harsh environments must be designed so that the outside envelope is infrequently opened and then only for maintenance. Each opening incident exposes the interior of the housing to infestation by all types of crawling and flying insects such as flies, mosquitoes and to entry of airborne contaminants such as blowing dust, etc.

To make the present water generator-dispenser desirable for office or home use, the unit can be fitted with optional subsystems for producing water at three temperatures, i.e., hot, cold and ambient. This is accomplished by adding a secondary heat absorber source. Heat absorber-2 is placed under the bottom surface of the storage tank and an insulated separator-baffle is added to the storage tank to separate ambient-temperature water from cold water. A cold-water-temperature sensor and switch assembly controls the operation of heat absorber-2 to maintain the predetermined temperature of the cold water zone, below the insulating baffle, at approx. 5 C.

To produce hot water, a heated, food-type stainless steel tank with an insulating jacket is added. The hot water tank is in fluid communication with the heated-fluid delivery control valve and the ambient temperature water in the storage tank. Water at a temperature of up to about 75 C. can be delivered from the heated fluid delivery control valve.

Also, an optional diverter valve is installed to allow pumping into a container outside the housing. The water generator/dispenser of the present invention fills a long-felt need for emerging countries and indeed many places in the world. A physician familiar with United Nations hospital and clinic programs in Africa had particular praise for the present dispenser's potential to solve their peculiar problems when operating in extremely remote areas. Further, a product development organization has indicated a desire to produce the office and home models for the USA. There is an immediate and critical need for the apparatus in many areas of the world, including USA. The design synergism of the present invention is evident from commercial response to the concept.

The objects and advantages of the present invention are:

(a) providing a means for obtaining and dispensing potable water from an apparatus that is consistent with the decor of an office or home yet requires no permanent external plumbing or air duct, (b) providing an apparatus for heating and chilling potable water collected from the atmosphere, (c) providing an apparatus which can operate indoors or outdoors so as to be available to operate in remote areas, (d) providing an apparatus which can easily be assembled from sealed, ruggedized modules, (e) providing a wheeled-cabinet apparatus that is portable, i.e., can be rolled about on packed earth, pavement, bare floor or carpeted surfaces, (f) providing an apparatus which can be operated from low-voltage DC by attaching solar-electrical generating panels or by variable-frequency AC electrical power generated from wind-driven generators, (g) providing an apparatus that has minimal chance of water contamination due to volatile organic compounds, VOCs, insects or rodents, (h) providing an apparatus of simple, modular construction and designed for operation over extended periods without operator attention, (i) producing high-quality, purified water, by preparing the unit with medical-grade tubing and including an inert surface coating on the dew-forming surface, (j) producing liquid-water condensate at air temperatures just above freezing by use of an air-heating strip, (k) dispensing potable water at a convenient height for adults or children or persons in wheelchairs, (l) producing contaminant-free potable water while running unattended for extended periods of a month or more, (m) producing high-quality, potable water in varied environments such as offices, houses, or jungles.

(n) providing a water generator/dispenser which is easily portable both indoors and outdoors, (o) providing options for potable water at three different temperatures, ambient, approximately 5 C. and approximately 80 C.

(p) producing potable water near or below the cost per liter of bottled water, (q) producing high-quality potable water within latest ASHRAE and U.S. federal standards for cooling and refrigerant apparatus, (r) providing a water generator/dispenser that can be easily transported by two adults using integral carrying handles, (s) providing a water generator/dispenser in which the exhausted air is filtered to remove dust, pollen, and airborne particles, (t) providing a water dispenser from which incoming air is charged with negative ions to facilitate particle separation, (u) providing a water generator/dispenser which will not produce or deliver condensate if either the air filter is removed or the subsystem for killing microorganisms fails, (v) providing a water generator/dispenser in which the electrostatic filter emits a loud whistle alarm when it needs cleaning.

Still further objects and advantages will become apparent from a consideration of the ensuing description and drawings.

BRIEF DESCRIPTION OF THE DRAWINGS

FIG. 3. is a diagrammatic rear view of the basic embodiment of the present invention.

FIG. 4. is a cut-away front view, with one vertical panel removed, showing diagrammatically the major components and subsystems of the basic embodiment of the present invention.

DESCRIPTION OF THE PREFERRED EMBODIMENTS

Figure 1A:
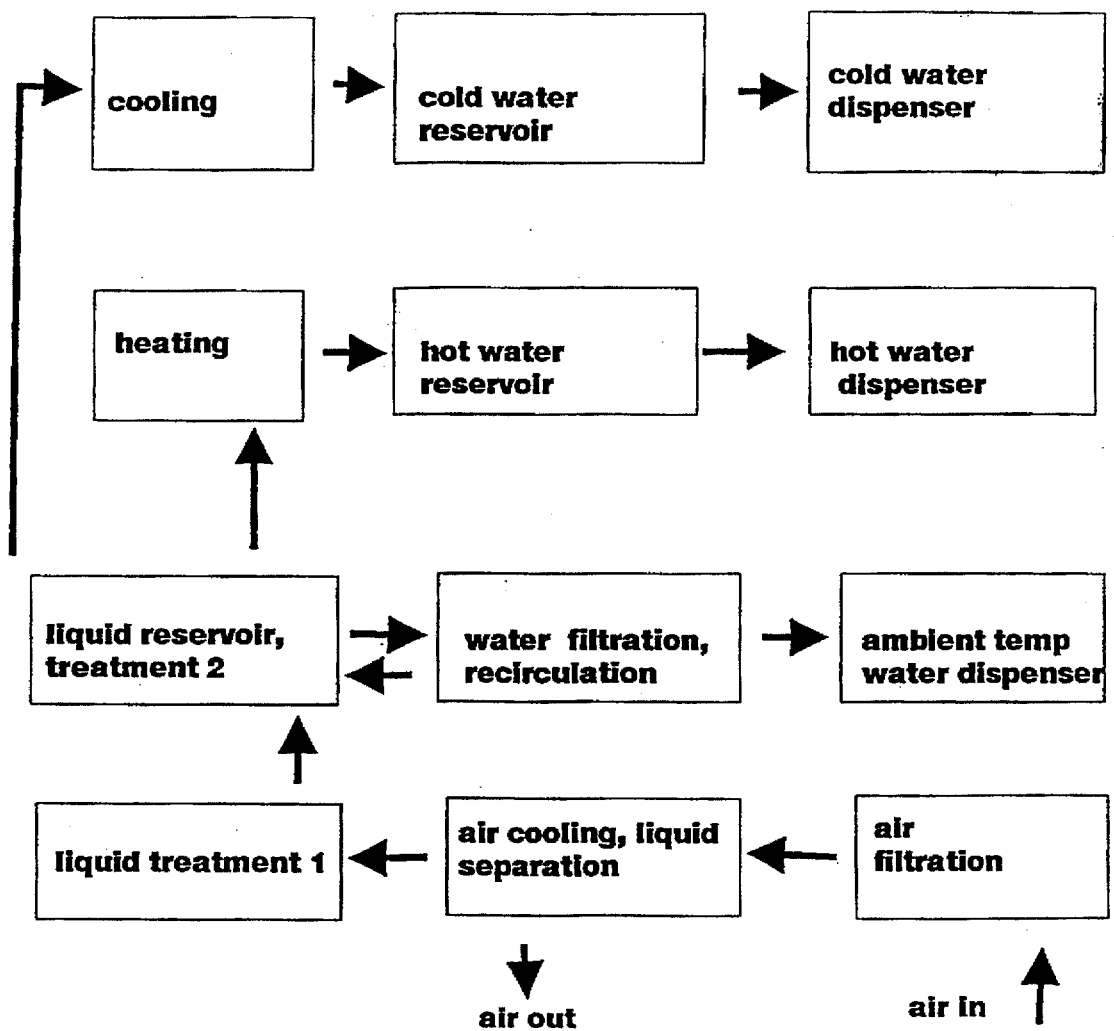
FIG. 1(a) is a block diagram showing the individual, functional components, sub-assemblies, controls, interlocks, alarms and interconnections which comprise the present invention and alternative embodiments which deliver cooled and/or heated water in addition to room-temperature water.
Figure 1B:
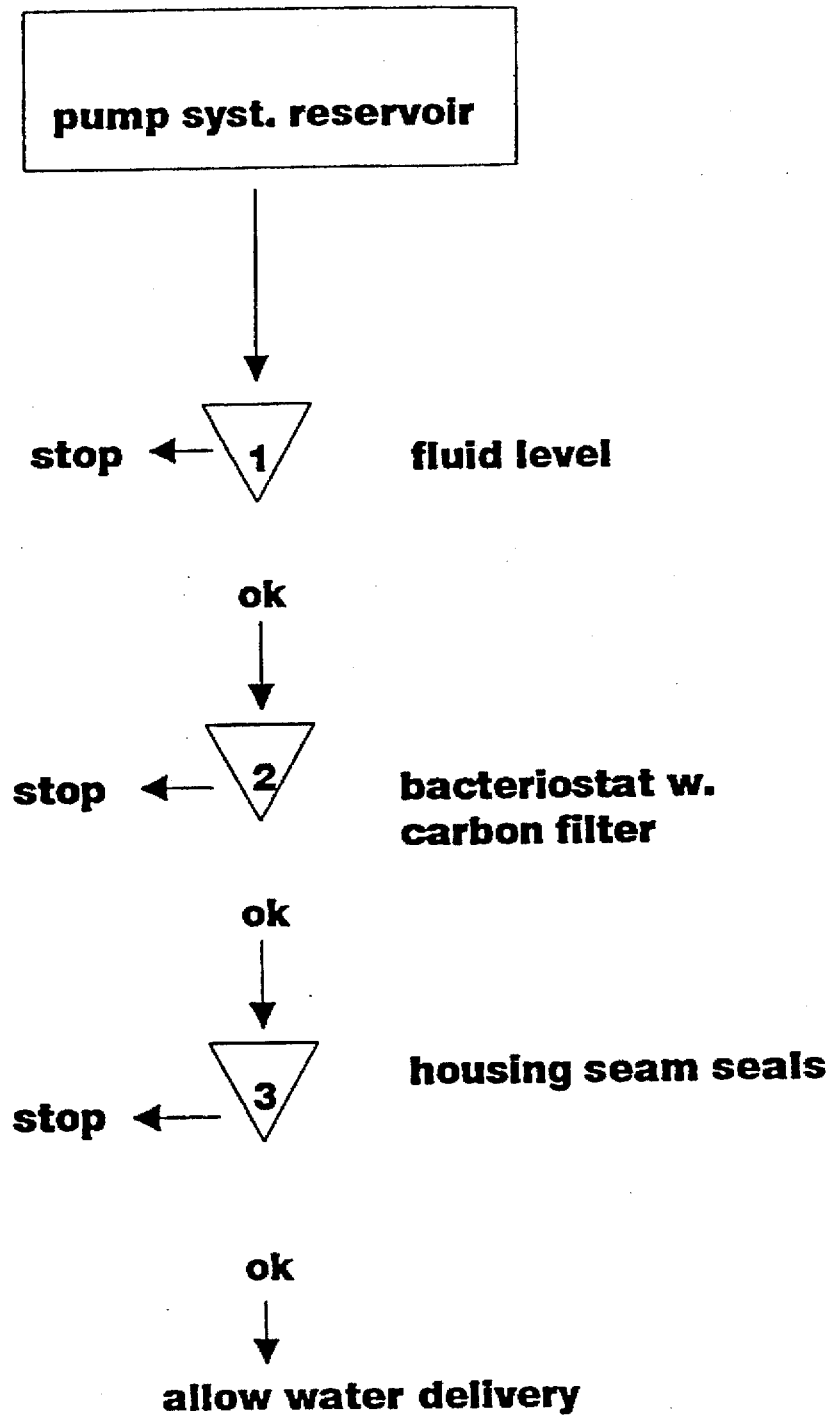
FIG. 1(b) is a schematic drawing showing the safety logic and functional interlocks to enable water delivery from the present invention.
Figure 1C:
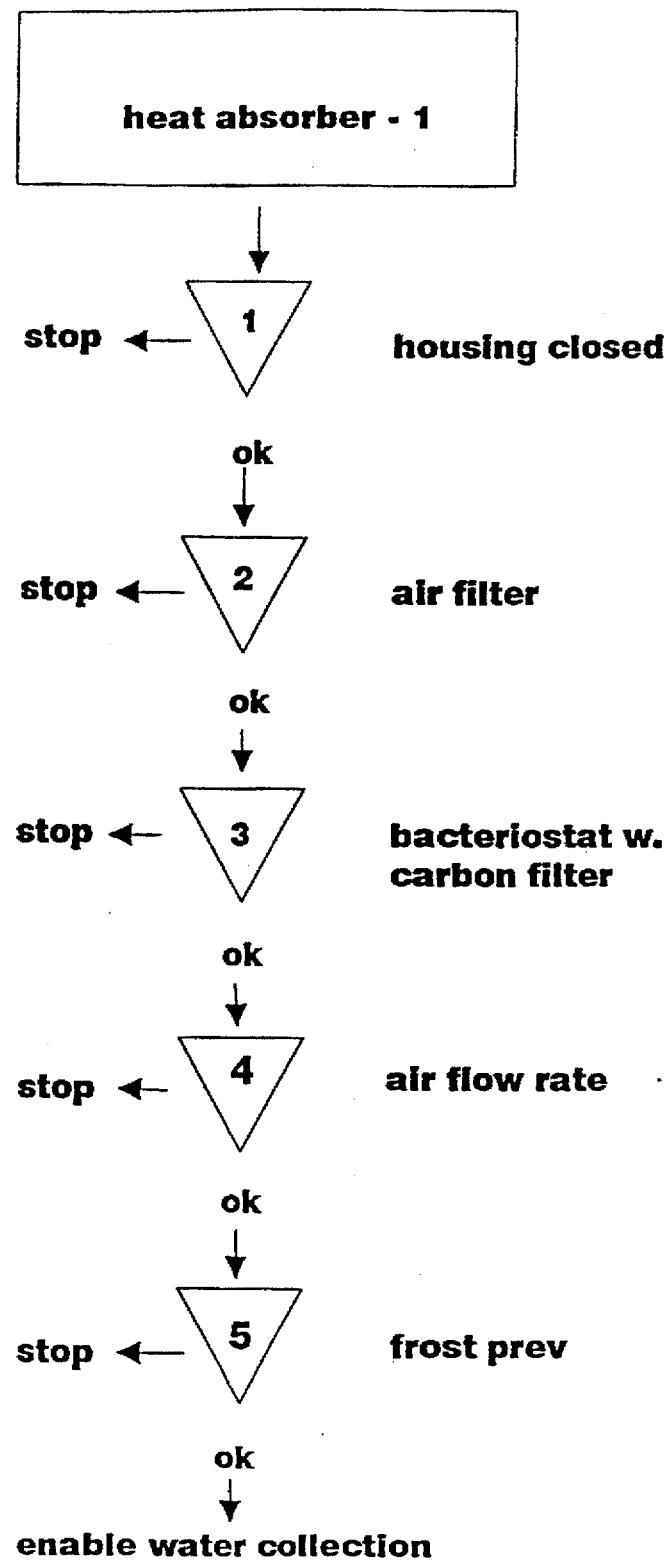
FIG. 1(c) is a schematic drawing showing the safety logic and functional interlocks to enable water collection by the present invention.
Figure 1D:
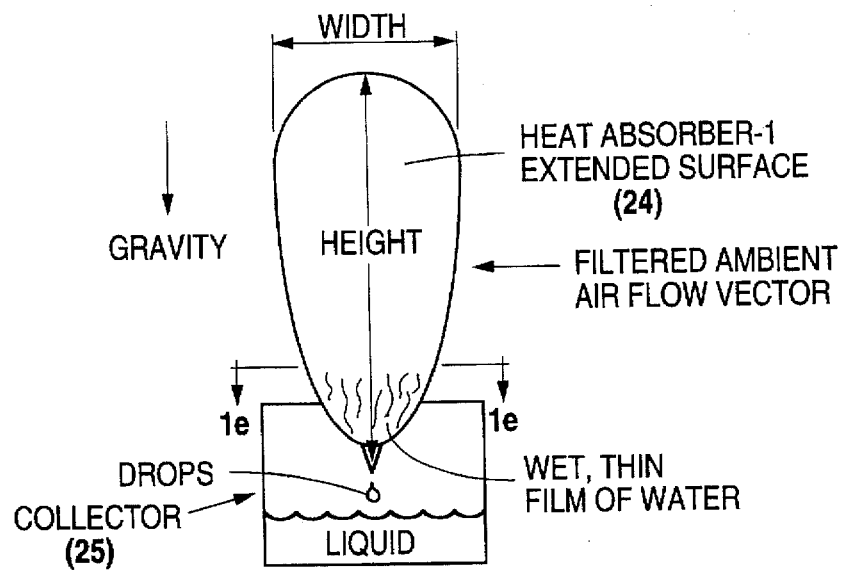
FIG. 1(d) is a vertical section view through heat absorber 1 showing the element-profile shape of the cooled heat-exchange surface, particularly the pointed drop guide for rapid draining of liquid dew from the lowest point.
Figure 1E:
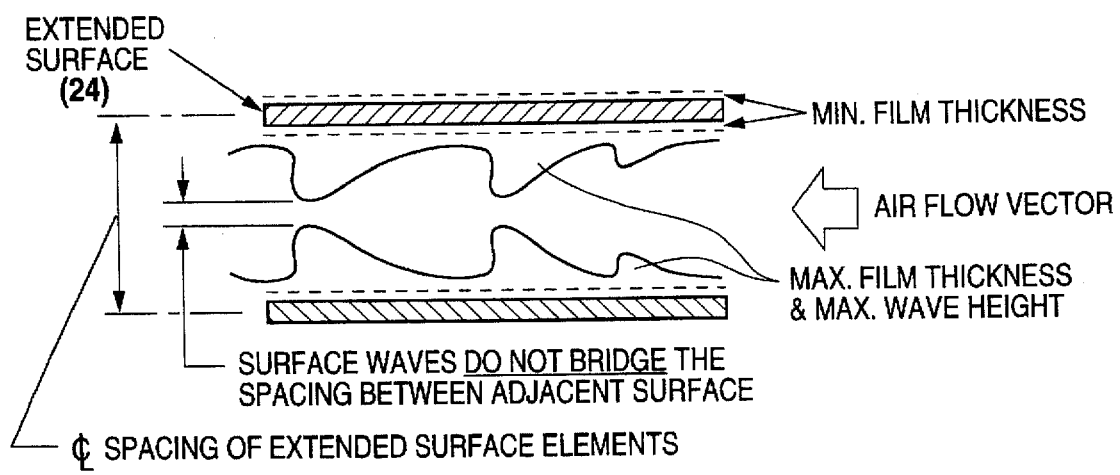
FIG. 1(e) is a horizontal section across two adjacent spaced-apart, vertical cooling elements showing the generally-horizontal air flow vector between the opposing surfaces and the thickness of minimum and maximum-thickness liquid-dew layers, especially the formation of surface waves due to momentum transfer from the air stream.
Figure 2:
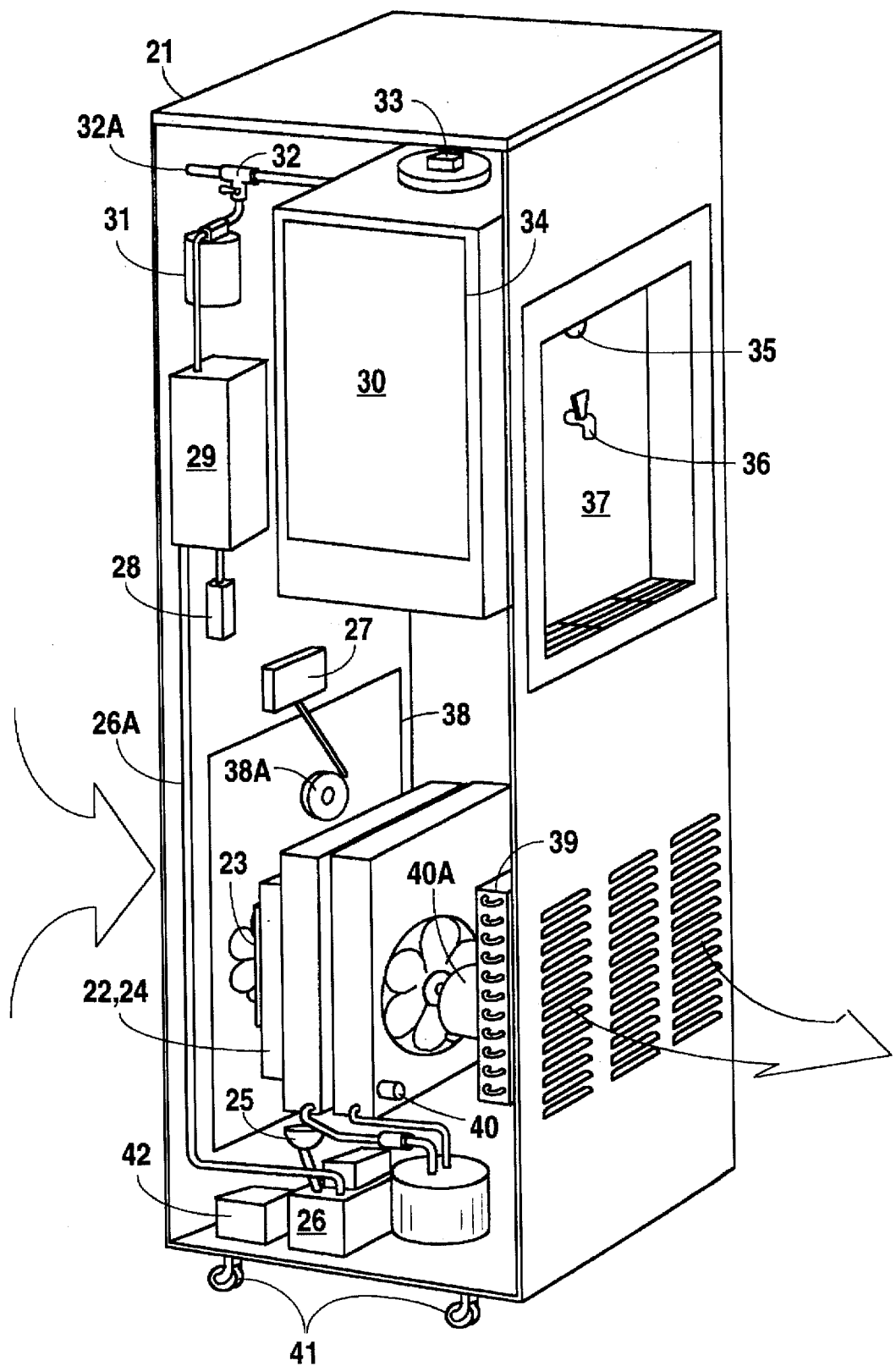
FIG. 2 is a cut-away perspective view, with one vertical panel removed, showing diagrammatically the front and left side of the basic embodiment of the present invention.

The water collection and treatment processes of the present invention are shown in FIGS. 1(a)–1(c). FIGS. 1(d) and 1(e) show design details of the dew-collecting surfaces of heat absorber 1. The general configuration of the basic water collection system is shown in FIGS. 2–4. The working components are enclosed in a housing (21) with a top cover, four vertical side panels and a base. The housing (21) incorporates a bracketed opening in the rear cover panel opening through which is inserted an electronic air filter (38). The air filter (38) contains a whistling, audible warning device (38-A) which signals when the air filter needs to be cleaned. An additional failsafe switch (38-B) prevents operation of the system when the air filter (38) is not in place.

Figure 11:
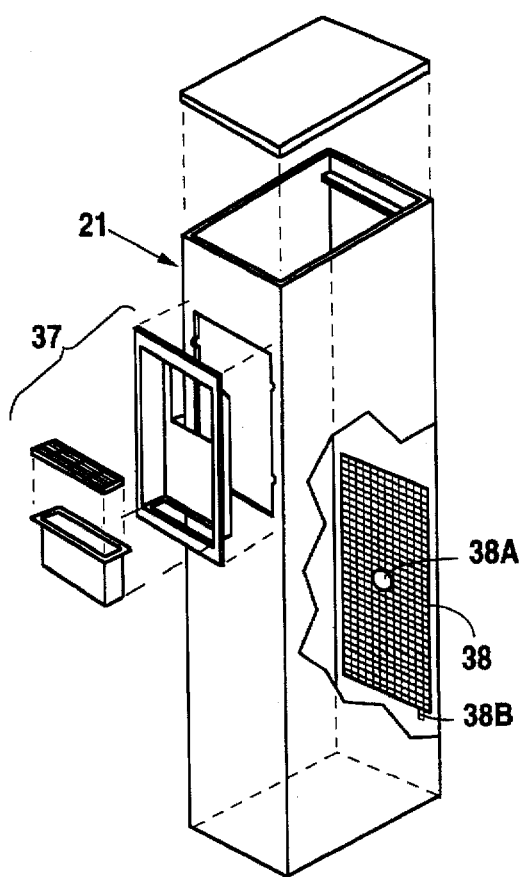
FIG. 11. is an exploded perspective view showing diagrammatically the front alcove assembly portion of the outside envelope of the basic embodiment of the present invention.

The housing (21) incorporates a front wall alcove opening and assembly (37) which consists of an alcove shell, grid and waste water receptacle; see also FIG. 11 for an exploded detail. Above the alcove is a low-light-level lamp, or "night light" (35). The alcove also contains a fluid delivery control (36) for dispensing ambient temperature water. The rear panel of the housing (21) has an inlet opening into the air filter (38) that includes a whistling alarm device (38-A). The front panel of the housing (21) provides an opening for air exhaust. This opening has an insect-resistant screen (49) on the interior of the housing (21) outlet port.

Operation of the apparatus is initially controlled by the manual on/off switch (50) located on the back side of the housing (21). The multi-speed fan control switch (51) is adjacent to the on/off switch (50) on the back of the housing (21).

Figure 13:
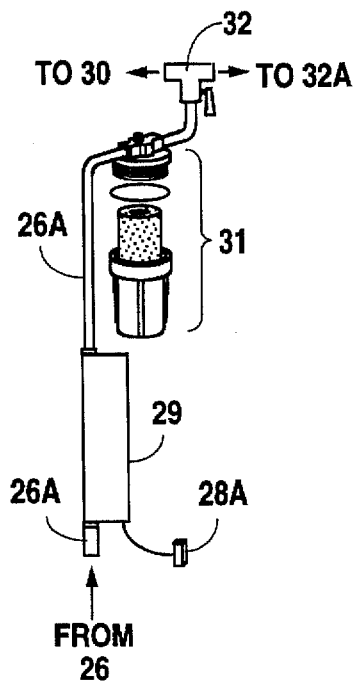
FIG. 13 is an exploded perspective view showing diagrammatically the details of bacteriostat, including the activated-carbon filter, for the basic embodiment of the present invention.
Figure 12:
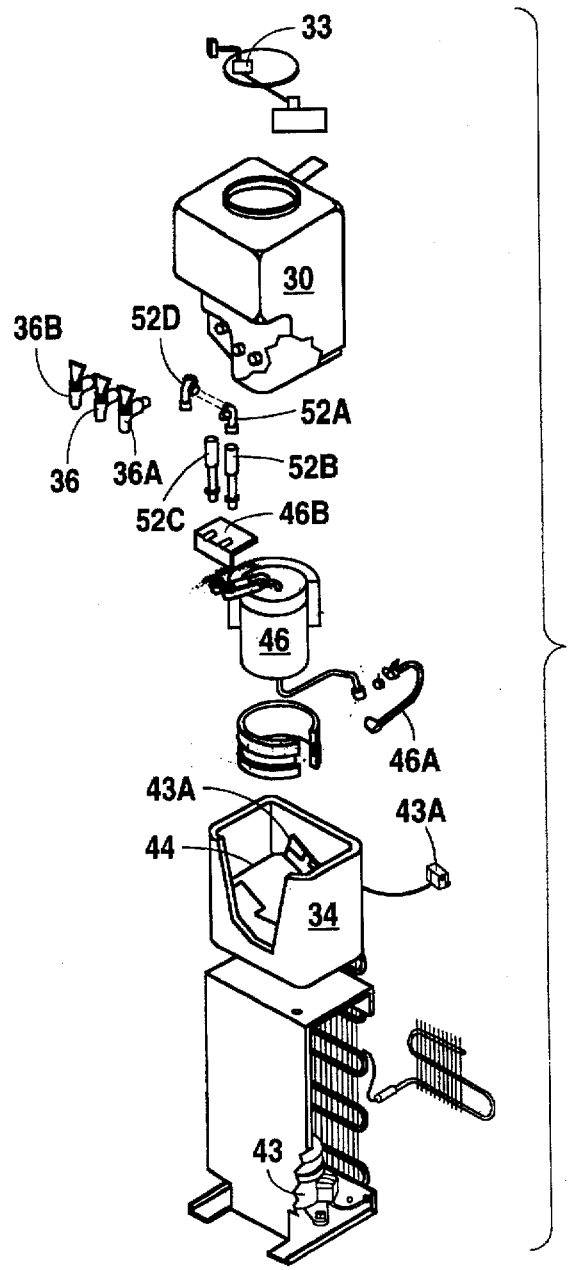
FIG. 12 is exploded perspective view showing diagrammatically the cold fluid tank, quick disconnects, heated fluid tank assembly, including connections, insulated jacket and the secondary heat absorber for an embodiment which collects and dispenses ambient, chilled and heated potable water.

Air Flow and Treatment. Air entering the housing first passes through the replaceable air filter (38) and across the serf-contained ionizing device (27). Air then is drawn past a heating strip and fan assembly (23), then across heat absorber-1 (22) and film-coated, dew-forming surfaces (24) by the multi-speed intake fan assembly (40-A), which is controlled by the multi-speed fan control switch (51). Liquid condensate flows by gravity into the enclosed sump (25) and pump system reservoir (26). The pump system (26) has a self-contained switch and liquid-level sensor which shuts off heat absorber-1 (22) when the reservoir is filled. From the pump reservoir, condensate flows through a section of tubing (26-A) and is recirculated through a bacteriostat subsystem, i.e., a pump, carbon block filter (31) and a ultraviolet germicidal light for killing bacteria (29). This subsystem is controlled by a fail safe switch (28) connected to an failsafe indicator light (28-A), as shown in more detail in FIG. 13. The bacteriostat indicator light (28-A) is located on the back panel of the housing (21).

As shown in FIG. 1(d), heat absorber-1 includes an array of extended-surface elements which are in good thermal connection with heat-sink contact zones at predetermined locations. The heat-sink points are mechanical-thermal connections adapted to remove heat from the extended surface and transfer it into an external environment. A variety of known heat-sink technics can be used to cool the extended surfaces, including classic boiling fluids contained in tubes, thermoelectric elements, and heat pipes. The heat-sink points are located at intervals of approx. 40–100 mm along the vertical center line of the extended area. The section profile of the bottom of the collector tray can be rectangular or half circle. As shown in FIG. 1(e) the extended surface elements are generally parallel and spaced apart a predetermined distance to avoid bridging over of surface waves due to heavy or maximum condensate flows and high air-flow velocities. The minimal condensate film thickness is indicated by dashed lines; this thickness corresponds to the condition when the air heaters are activated and operating at maximum power to prevent icing over.

Water in the reservoir is recirculated through the bacteriostat subsystem, including the activated-carbon final filter system assembly (31). The final water filter is fitted with a replaceable activated-carbon adsorbent cartridge which is capable of removing organic contaminants and heavy-metal compounds. Processed water is then held in fluid reservoir-1, (30), which includes a form-fitted insulating jacket (34); through use of a diverter valve (32), processed water can also be delivered through a diverter valve outlet (32-A) to a large external collection container. The water level in the fluid tank (30) is controlled by the electrically-operated sensor switch and lid assembly (33), which causes the pump (26) to cease operation when the fluid tank (30) is filled.

Ambient temperature water is dispensed from a compartment within the fluid tank (30) via the ambient fluid delivery control (36). Disposable liquid containers, e.g., paper cups, suitable for cold water, are provided from attached dispenser (47) mounted on the side of the housing.

Fluid reservoir-1 (30) is removable from the housing for cleaning without removing its insulated jacket (34). This is accomplished by pulling aside the level sensor and lid assembly (33), which remains in the unit. The ambient fluid delivery control (36) remains affixed to the fluid tank (30). The fluid tank (30) can be cleaned using cleaning materials appropriate to its materials of construction and in accordance with public health requirements governing use of cleaning materials for food handling and potable water systems. By design of the present invention, mechanical removal of fluid reservoir-1 (30) is simple, and can be accomplished without disturbing the permanent tubing connections.

Additional and Optional Features. The housing (21) can be fitted with an ozone generator (39) adjacent to the departing air stream to further add to air quality. The housing (21) also contains an ultrasonic pest control device (42) which is operates continuously. To provide for mobility of the apparatus, four casters or rollers (41) suitable to the weight and size of the present invention are affixed to the four corners of the lower side of the base of the housing (21). Two handles suitable to the weight and size of the present invention are fixed, one on each side of the housing (21).

ALTERNATIVE EMBODIMENTS

Figure 5:
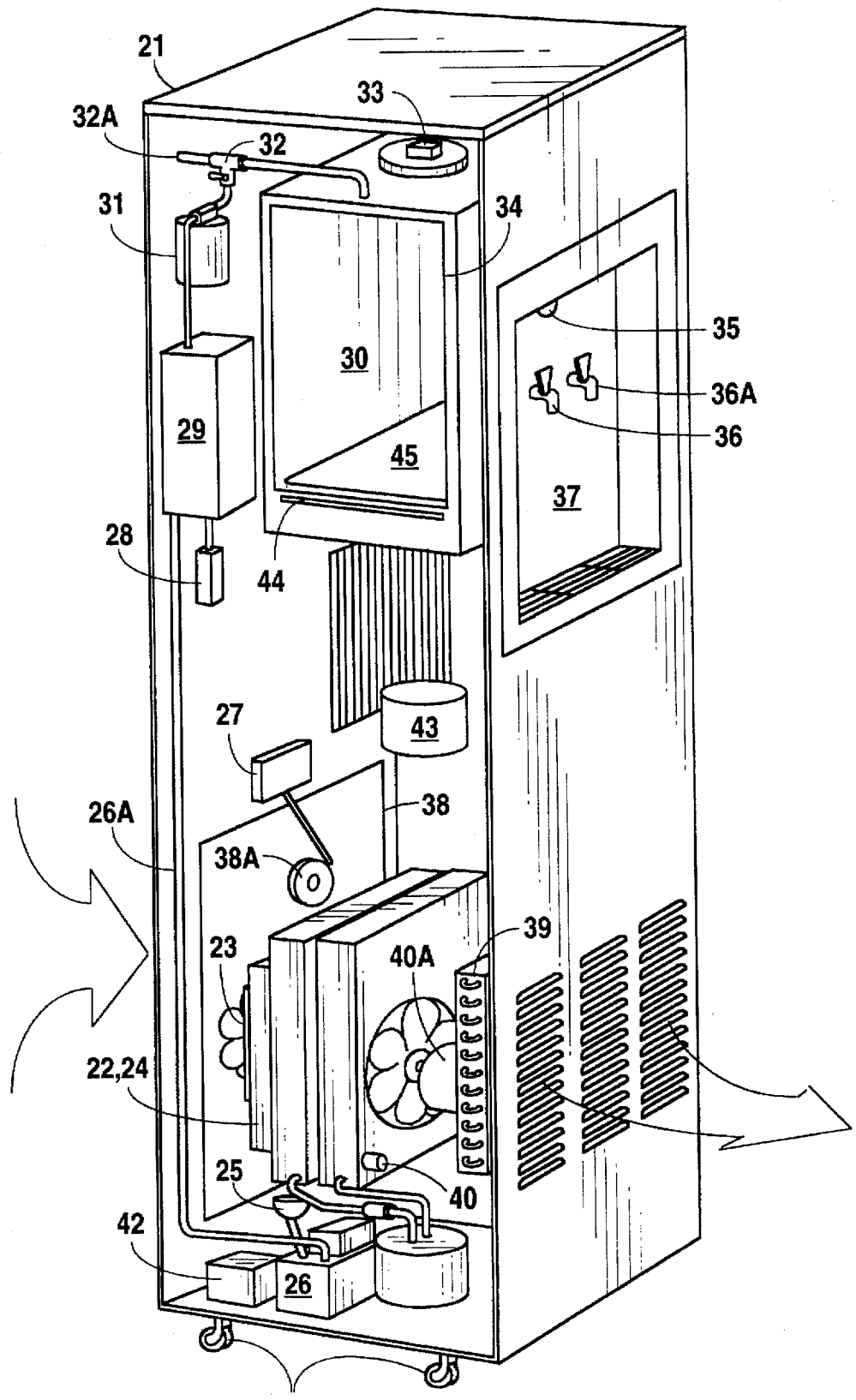
FIG. 5. is a cut-away perspective view, with one vertical panel removed, depicting a second, alternative embodiment of the present invention showing the addition of components to collect and dispense chilled water.
Figures 6, 7:
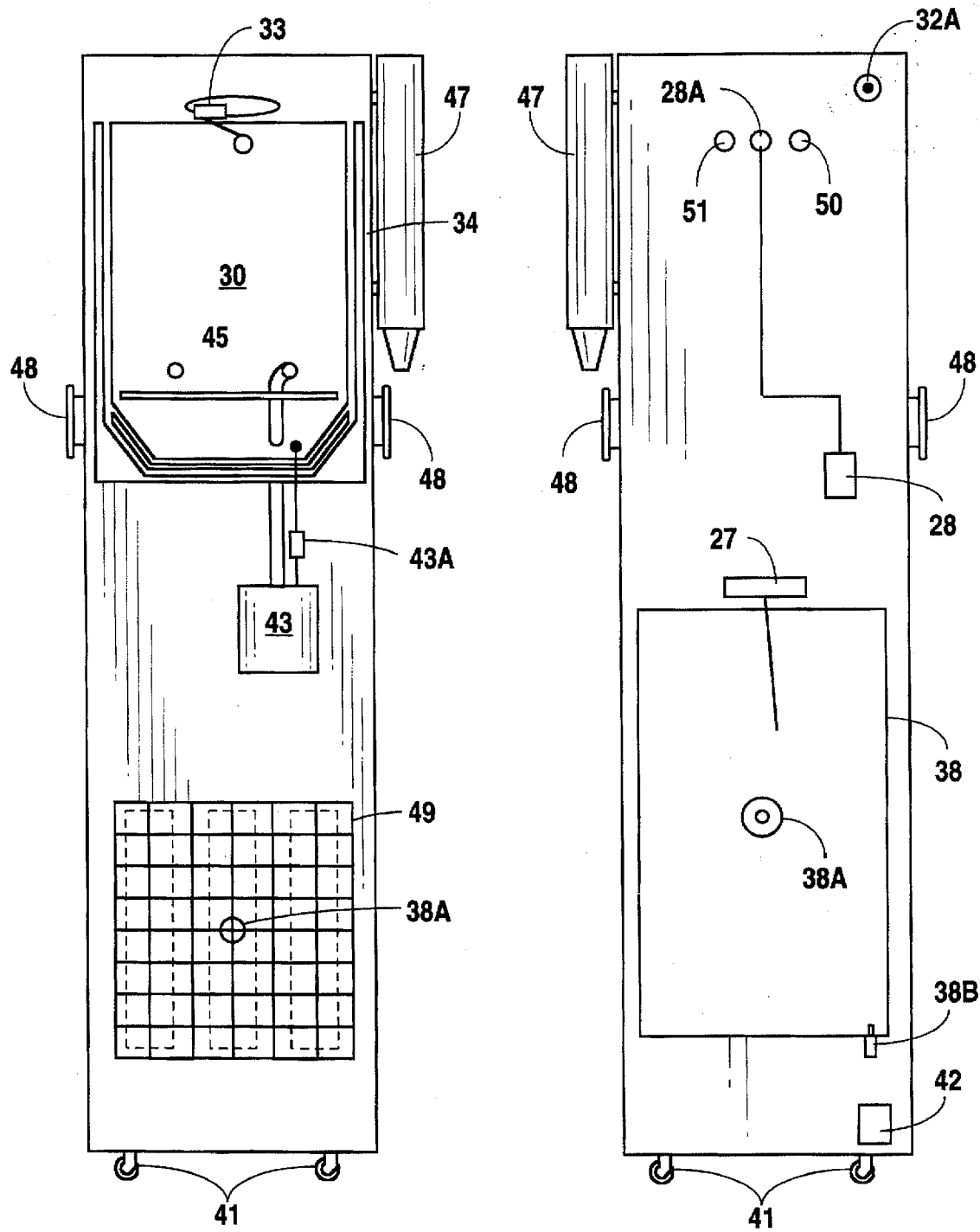
FIG. 6. is a cut-away front view depicting diagrammatically the interior (as viewed from the front) of a second alternative embodiment of the present invention showing the addition of a components to collect and dispense chilled water and ambient-temperature water.
FIG. 7. is a cut-away rear-diagrammatic view depicting the rear of the second alternative embodiment of the present invention which collects and dispenses potable water, showing the addition of components to produce and dispense chilled and ambient-temperature water.

Model 2. As shown in FIGS. 5–7, another embodiment of the present invention, Model 2, contains all elements of the basic model and also dispenses chilled water at a nominal temperature of 5 C. in addition to ambient temperature water. The chilled water is produced by incorporating a secondary heat absorber (43), which is controlled by the cold water temperature sensor and switch assembly (43-A). The heat-exchange probe (44) of heat absorber 2 is positioned between the insulation jacket (34) and the cold fluid tank (30A). An insulated baffle (45) is located in the storage cold fluid tank (30A) allowing for ambient water to be stored above the baffle and chilled water to be stored below the baffle. Chilled water is dispensed via the chilled fluid delivery control (36-A).

Figure 8:
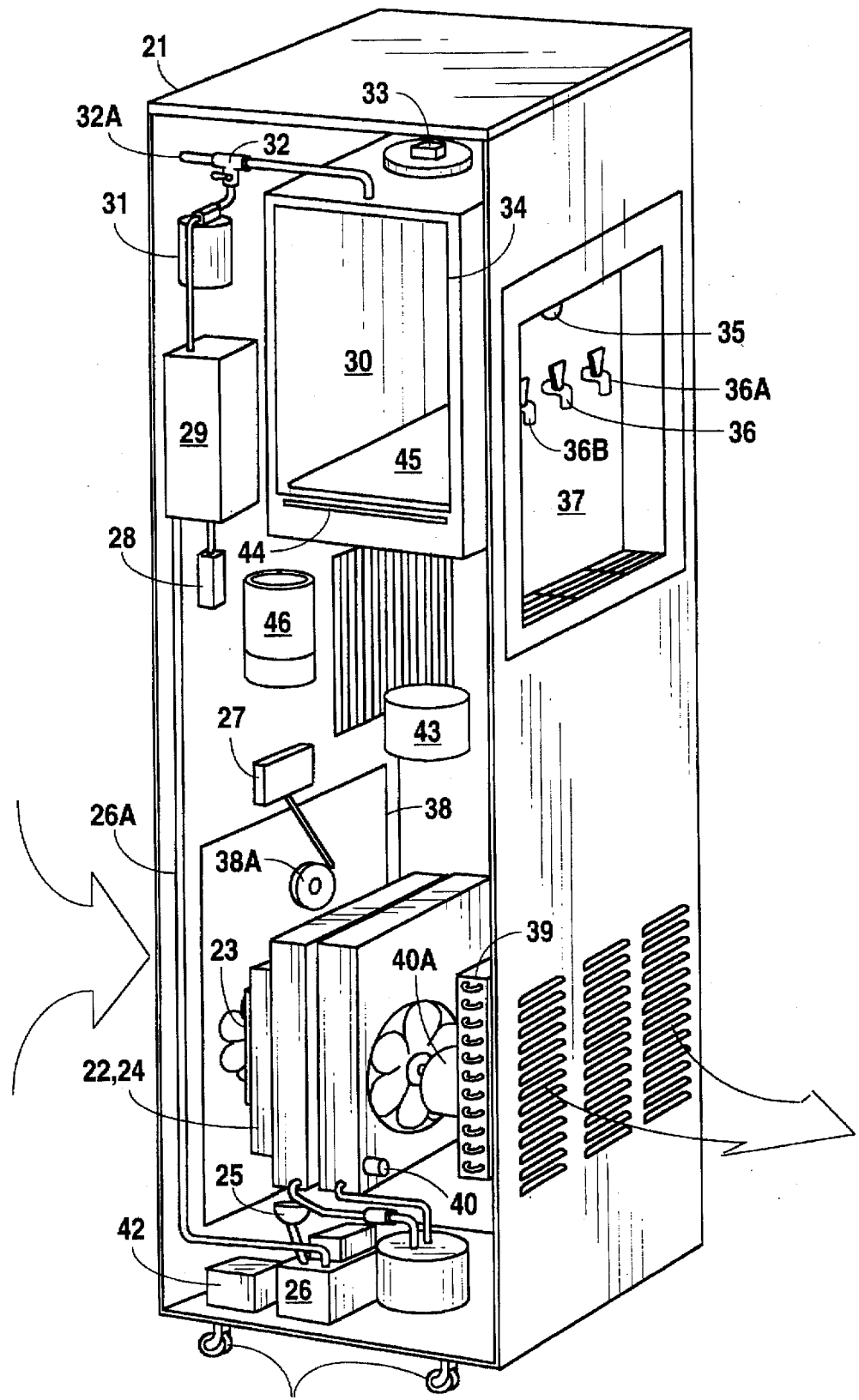
FIG. 8. is a cut-away perspective view showing a third embodiment of the present invention which prepares and dispenses potable water at three predetermined temperatures, i.e., ambient, chilled and heated.
Figure 9:
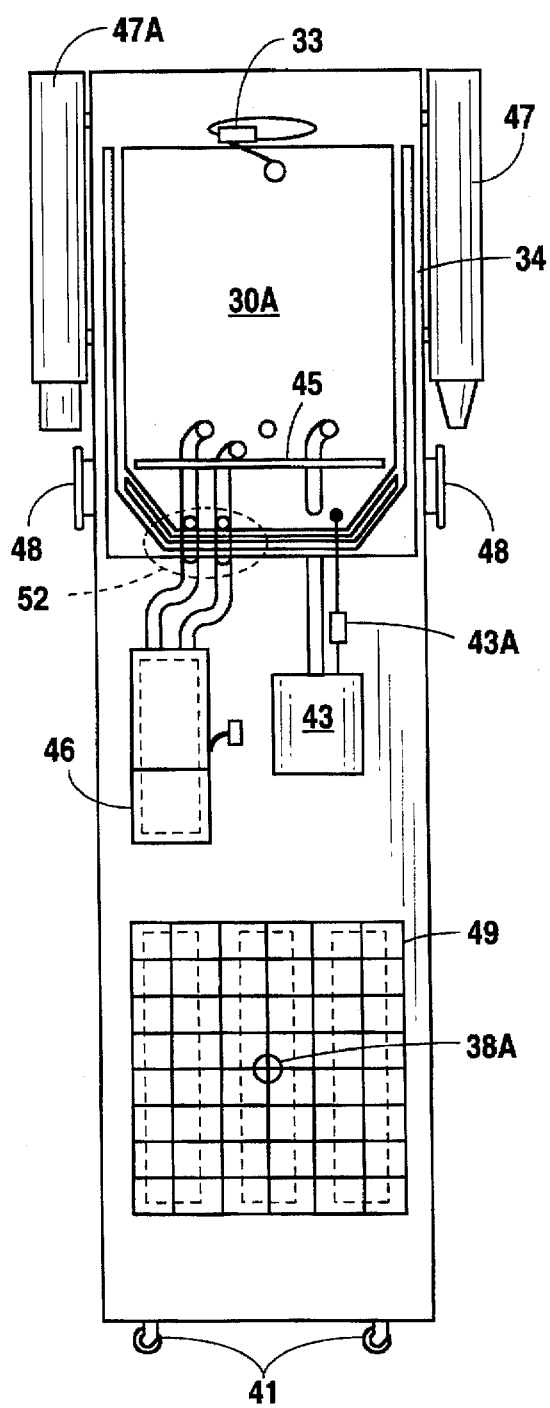
FIG. 9. is a cut-away rear view showing diagrammatically the interior of the third model of an apparatus that collects and dispenses potable water at ambient, chilled and heated temperatures.
Figure 10:
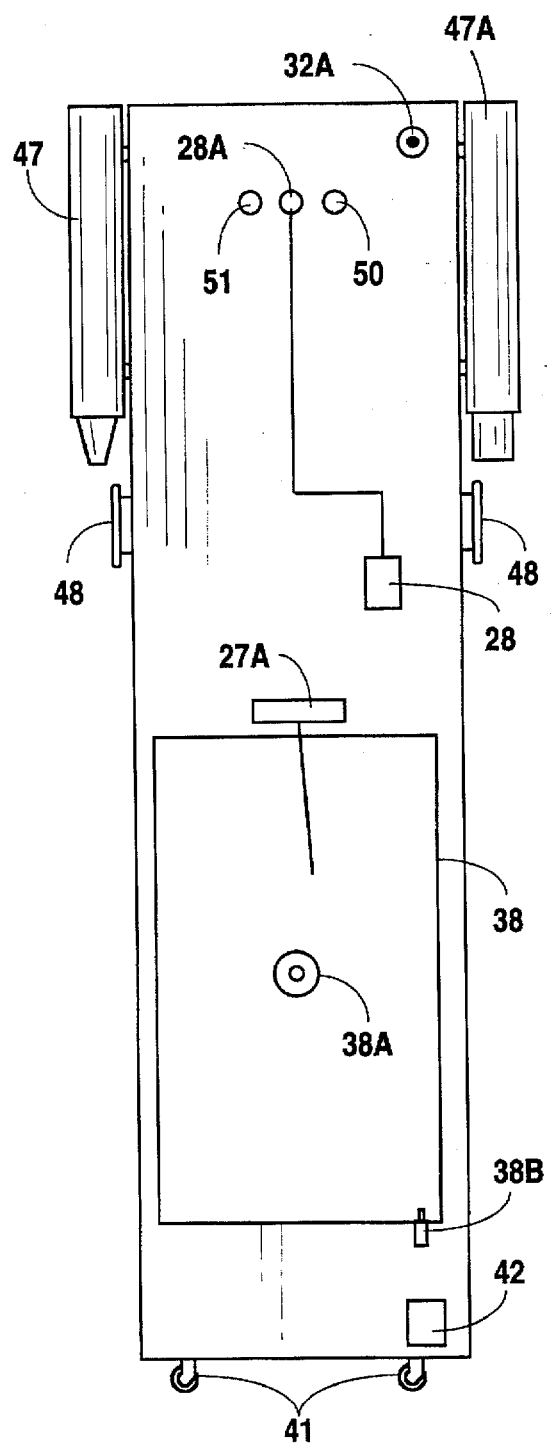
FIG. 10 is a cut-away front view showing diagrammatically the interior of the third model of an apparatus that collects and dispenses ambient, chilled and heated potable water.

Model 3. As shown in FIGS. 8,9 and 10 another embodiment of the present invention, Model 3, includes all of the elements of the basic model and Model 2, but also dispenses heated water at a nominal temperature of 75 C. Ambient-temperature water is supplied via a plumbing "tee" connection behind the ambient fluid delivery control (36) and connected to the hot water tank assembly (46) by means of a "quick" disconnect connection assembly (52), which is described below. The hot water tank assembly (46) includes a sealed stainless steel tank of the appropriate grade and type of stainless steel utilized for food handling, provided with an electric heater and insulating jacket (46). Temperature of the hot water is controlled by a heated water temperature control sensor and fuse assembly (46-A). A dispenser (47-A) for disposable liquid containers, suitable for hot water, is attached to the side of the housing. As described earlier, a quick-disconnect system (52) the hot water tank (46) to the ambient fluid delivery control system by means of a "tee" connection. The same quick- disconnect system (52) links the heated fluid delivery control (36B) to the hot water tank assembly (46) to enable easy removal of the cold fluid tank (30) for cleaning, without the need for manual connections and disconnection of plumbing. As shown in FIG. 11, the quick-disconnect system (52) consists of a pair of receiver adapters, as follows: male adapter (52-A) connects with female receiver (52-B) to carry ambient temperature water into the hot water tank assembly (46). A male adapter (52-C) connects with female receiver (52-D) linking the hot water storage tank (46) with the heated fluid delivery control (36B). The tube divider (46-B) physically separates the adapter system tubing and connections. This quick-disconnect system allows for removal and reinstallation of the main water cold fluid tank (30) without manual interference with the refrigeration system, the water tubing or the hot water tank fittings.

OPERATION OF THIS INVENTION

In this invention, heat absorber-1 (22) produces condensate on an inert-coated surface (24). This system is explained below. Incoming air is filtered by an electrostatic filter assembly, including the filter (38), a filter warning whistle (38-A) and the air-filter failsafe switch (38-B).

An ionizer (27) puts a negative electrical charge into particulate matter in the incoming air stream affecting to assists in the trapping of particulates in the electrostatic filter. If desired for operation in a home or office, an optional ozone generator (39) can be included; this addition allows the present invention to function as a charged-particle generator and room-air purifier.

Condensate collected from the air flow across the extended area cooling surface (24) flows downward by gravity to a temporary collector for condensate (25) and is further conducted by gravity flow into a pumping reservoir assembly (26). In this assembly there is a self-contained float switch which actuates the condensate pump when a predetermined water level is reached. The condensate is conducted through UV-transparent tubing (26-A) prepared to comply with medical and human food-handling requirements. The condensate is subsequently exposed in multiple passes to a bacteriostat, or apparatus for killing bacteria, such as an ultraviolet germicidal light, (29). The bacteriostat (29) is monitored by the fail-safe switch (28). A fail-safe indicator light (28-A) on the exterior of the housing (21) confirms proper operation of the bacteriostat. If the bacteriostat is not enabled, as indicated by the light being "on", operation of the entire machine is stopped.

The condensate is pumped under positive pressure through an activated-carbon purification filter assembly, and then pumped into fluid tank (30), or (30A) for Model 2 or 3, made of plastic or stainless steel as is common for all food-service contact. The fluid tank is encased by form-fitting insulation jacket (34) made of a nontoxic material, such as closed-cell polymer foam. A fluid delivery control (36) is installed into the storage fluid tank (30) using nontoxic sealants suitable for contact with potable water intended for human consumption. The fluid tank (30) is removable for cleaning. The fluid delivery controls (36, 36A, 36B) are at an ergonomically-correct level above the floor, making water easily accessible for children or persons in wheelchairs. A holder (47) for disposable cold-liquid containers is shown in close proximity to the fluid delivery controls (36).

A major improvement in the design of the present invention is the elimination of the standard deicing system and including in its place a heat strip and fan assembly (23). An electric-powered heating element and defrost sensor (40) senses when the heat-exchange surface of heat absorber-1 (24) is about to freeze over. Rather than turning off heat absorber-1 (22), as in typical old-art refrigeration systems, the temperature sensor (40) activates the heat strip and fan (23) which warms air passing over the cold surfaces (24) just enough to keep the accumulated liquid dew from freezing. The warmed air usually allows more moisture to be extracted from the incoming air flow.

Because the present invention can operate for long periods without human tending, a manually operated diverter valve (32) allows the potable water to be pumped to a remote cistern. Diverting the water flow does not disturb dispensing water from the storage cold fluid tank, provided that the tank contains water.

The cold and ambient fluid delivery control (36) and (36A) extends from the fluid reservoir-1 (30) through the front of the housing (21) into a common dispensing alcove assembly (37) containing a grill-type drain insert to collect waste water. A night light (35) above the alcove provides illumination for water dispensing during periods of darkness or low light levels.

An ultrasonic pest control device (42) and extraordinary attention to sealing the housing (21) with nonporous, nontoxic sealants allows the present invention to operate for extended periods of a month or more indoors or outdoors without human tending.

Model 2 contains all subsystems which allow it to produce and dispense chilled water in addition to the ambient temperature water. The chilled water is dispensed at a nominal temperature of 5 C. Chilling of the collected purified water is accomplished is by adding a secondary cooling device, heat absorber-2 (43). The cooling surface (44) is positioned between the insulation jacket (34) and the bottom of the fluid reservoir-1 (30). To avoid cooling all of the liquid in the fluid reservoir-1, because this model also dispenses ambient temperature liquid, an insulated baffle (45) is placed in the fluid reservoir-1 (30A) allowing for ambient water to be stored above and cold water to be stored below. The cold water below the baffle is delivered through the cold-fluid delivery control (36-A); The ambient-temperature water is delivered through the ambient temperature fluid delivery control (36). Both fluid delivery controls protrude from the fluid reservoir-1 (30) through the front of the housing (21) into the dispensing alcove assembly (37).

Because the fluid reservoir-1 (30) is removable for cleaning without dismantling the internal mechanisms, the present design represents a significant improvement over old-art systems.

Model 3 of present invention includes subsystems which permit it to produce and dispense heated water in addition to ambient-temperature water and chilled water. Heated water is dispensed at a nominal temperature of 75 C.

Heating of the water is accomplished by adding a heated water tank assembly (46) comprising a stainless steel tank in compliance with food-handling codes, a heater, an insulated jacket and a fused water-temperature control assembly (46-A). Ambient temperature water is drawn into the hot water tank through a quick-disconnect tee fitting behind the ambient temperature fluid delivery control (36). Hot water is dispensed through the hot fluid delivery control (36B), which is connected to the hot water tank assembly (46). The quick-disconnect receiver-adapter assembly system (52) allows easy removal of the fluid reservoir-1 (30) for cleaning, without the need for manual connections and disconnections. The ambient temperature water portion of the assembly consists of a quick disconnect male adapter (52-A) that mates with the quick disconnect female receiver (52-B) to supply incoming water to the water heater tank (46). The heated water portion of the assembly consists of a quick disconnect male adapter (52-C) that mates with the quick disconnect female receiver adapter (52-D) to supply heated water to the hot fluid delivery control (36-B).

This unique disconnect concept represents a significant design improvement over old-art systems.

EXAMPLES

Examples M1 and M2 below give technical parameters for the design and inert surface coating of the extended heat-exchange area of heat absorber 1, i.e., the air cooling and dew-collecting surface.

Example M1

Extended Heat Exchange Area

Incoming ambient air at a velocity of 1–10 meters/sec is cooled below its dew point by circulation across an array of generally-vertical, spaced-apart, cooled surfaces shaped and oriented to drain collected liquid dew dropwise from a pointed zone. The active extended cooling area for both sides of each element in the array is in the range 100–500 cm2; the total active area of the array is in the range of 1–4 m2. The general outline shape of the dew-forming elements is shown in FIG. 1(d). The height dimension of each cooling element is in the range of 15–40 cm; the element width dimension is in the range of 3–10 cm. The height dimension is measured generally parallel to the gravity vector; the width dimension is measured generally perpendicular to the gravity vector. Each element is formed from one or more sheets of high thermal conductivity material of thickness in the range 0.2–1.5 mm. The average center-line spacing of adjacent cooling elements is in the range 3–10 mm. For increased convective heat transfer, the profile may be either parallel—planar elements, as shown in FIG. 1(e) or parallel-corrugated elements. Parallel-corrugated elements may be prepared by 3D forming of planar elements to include an array of ridges and valleys arranged parallel to the vertical or at an acute angle in the range 1–15 deg to the vertical. As shown in FIG. 1(e), surface waves formed on the maximum-thickness draining liquid condensate layer do not bridge across the element spacing. It has been found that dew-bridging results in liquid trapping and ice-blockage of the air-flow channels between elements. Heat absorption from the extended area can be accomplished by a variety of cooling means thermally connected to the area; such cooling methods include refrigerant-expansion coils, thermoelectric coolers, heat pipes, etc. The design of heat absorber 1 includes defining the number, size and placement of cooling conductors to cool the extended surface elements. In the case of cooling by a boiling liquid in contained tubes, the tubes are oriented generally horizontal and perpendicular to the extended surface plane. Several refrigerant tubes of 3–6 mm diameter spaced apart at a distance of 40–100 mm have been found to provide effective cooling. Extended surface elements may be formed from thermally-conductive metals, alloys, ceramics/glasses and polymer composites including Al, Al-alloys, Cu, Cu-alloys, Al-filled amide or olefin polymers and ceramics.

Example M2

Inert Surface Coating

To prevent chemical interaction of the dew condensate with the exposed cold surfaces of heat absorber 1, all such exposed, cooled surfaces are coated with a continuous, thin, inert, food-grade film of polymer such as siloxane, PTFE, urethane, olefin, etc. All exposed surfaces of the heat absorber which come into contact with liquid dew are cleaned to remove surface contaminants such as grease, oxides and other adventitious residues. An inert coating of thickness in the range 0.01–0.2 mm thickness is then applied by methods such as spraying, dipping, electrostatic coating, etc. Post application, the film coating is cleaned to remove any volatile or extractable components which might contaminate the dew or water being produced.

Example M3

Air Filters, Alarms and Interlocks

The first line of defense against insect penetration into the unit are woven-wire screens covering the entire area of both the inlet and outlet air ports. The screen mesh openings range from 0.3 mm to approx. 1.0 mm in diameter. The depth and screen elements of the air filter apparatus are prepared and sized to achieve approx. 99.99% filtration of all solid particles of diameter greater than 1 micrometer for an air flow rate of 4–9 m3/min. The filter apparatus is fitted with a pressure drop sensor which will permit buildup of collected particles of approx. 65% of the limit capacity of the element before an alarm condition is signalled; the filter-overload alarm is an intense, high-frequency acoustic whistle.

The air filter is fitted with electrostatic charging devices, such as agitated filament arrays or high-voltage corona wires, which facilitate retention of smaller, less-dense airborne particles. The air filter is also fitted with an interlock switch which prevents operation of the entire generator if the element is incorrectly positioned or an incorrect size is used.

Bacteriostat System and Interlocks. The bacteriostat system includes two stages: (a) an active killing stage for microorganisms and (b) an activated-carbon adsorption stage for removing undesirable and toxic organic impurities which are present as vapors in the ambient air and will be dissolved in the condensate water produced. The killing stage can employ electromagnetic radiation, such as UV or gamma, of selected intensity and wavelength, to kill adventitious bacteria and viruses which are present in the condensate water. Alternatively, the killing stage may employ one or more physiologically-tolerated oxidizing chemical species such as ozone or hydrogen peroxide for killing bacteria. It is of course important to provide an exposure chamber which allows the condensate water to be exposed to or circulated through the killing zone. Either the UV lamp or the ozone generator are fitted with positive interlocks which shut down the delivery pump if the device is not operating within control ranges of wavelength, intensity or ozone rate.

Example M4

UV Germicidal Lamps

The simplest and least expensive killing stage includes a high-intensity, short wavelength ultraviolet lamp, UV sterilizing device, and fusible link interlock with the recirculation pump. Should the UV lamp fail to operate at an effective wavelength and intensity, electrical interlocks prevent the circulation pump from operating; in this event, no water can be delivered from the generator. The UV generator can be: (a) mounted into the cover of the reservoir for direct exposure or (b) mounted adjacent to a section of low-pressure tubing which transmits the effective radiation wavelengths through the water. In addition to quartz, known UV-transmitting glasses, polymers or ceramics may be used for the UV-lucent tube zone. The treatment zone or chamber must also be fitted with UV reflectors to maintain a high intensity level of the effective wavelengths and prevent accidental UV exposure during maintenance work. For the UV lamp, the GE model T5 has been found to give good results.

Alternative Ozone or Ultrasonic Water Treatments

As an alternative to the UV sterilization device, an ozone generator or an intense ultrasonic field can be used for water sterilization. The ozone systems operate by electrochemical formation of microbubbles of O3 in the condensate water. Known piezoelectric or magnetostrictive ultrasonic probes can be fitted to a section of tubing or mounted to immerse the probe into the reservoir tank.

Example M5

Ozone Gas Generators for Air Freshening

Gaseous ozone is thought to assist in removal of undesirable vapors and aerosols from the ambient air. An optional ozone generator can be mounted in the air-handling section of the present invention. Several alternative ozone generators have been evaluated for conditioning the air being circulated through and discharged from the present water generator; the most cost-effective seems to be the Bora model from Alpine Ind.

Example M6

Air Ionization Pre-Treatment

Electrostatic charged-particle generators of various types such as polonium strips and Sanyo HAF 3000 ion generators have been evaluated and found to work well with the present air filter for removing aerosol particulate contaminants. Charged particles emitted from the generator impart a charge to the particles which makes them easier to filter. Such modules are connected to the main controls with a fail safe circuit to prevent operation if the ionizer is not operating within control limits.

Example M7

Activated Carbon Block Filter

The simplest and least expensive adsorber for volatile organic compounds, VOCs, includes a porous activated-carbon block filter; such a filter is connected in series with the UV sterilization device. At a flow of 0.8 to 2 liter/min, the cartridge is capable of trapping 1–2 micrometer diameter suspended particles, removing taste and color bodies and reducing dissolved toxic hydrocarbons to acceptable levels for safe drinking water. Should this filter become substantially blocked, the power to the recirculating pump will be interrupted. Water is continuously recirculated through the UV and activated carbon units when the generator is "on". Carbon filters such as the Amtek C240 MMB have been used for the activated carbon VOC filtration. In regular operation, no water which has not been passed repeatedly through both can be delivered from any output valve, including, cold, ambient, hot and the diverter valves.

Persons skilled in the art may conceive of other alternative embodiments and combinations of additional features and subsystems to those disclosed and still not depart from the broad scope of the present invention as claimed below.

What is claimed is:

1. A portable, potable water recovery and dispensing system for use inside a home, office or, in an emergency situation, unprotected outside a building, comprising:

a. a wheeled, finished, furniture-type housing enclosure having four vertical side panels with handling grips on at least two of said panels, a top panel and a bottom panel, said housing provided with tightly-sealed seams between said panels and insect-preventive openings for all hinged or lift-out service-access sub-panels, through-wall connections and pass-through openings, including openings for mechanical controls, tubes, valves, electronic cables, power cables and air-transfer ports, b. edge-sealed inlet and exhaust air-transfer ports of area in the range 0.1 to 0.5 m2 covered with insect-resistant screens, c. ducted particle-generating means sealingly connected downstream of said inlet air-transfer port provided with at least one of: (a) electrodes for generating charged particles and ions or (b) one or more radioisotope sources for emitting charged particles, said particle-generating means sealingly connected to said air inlet port, c. filtration means adapted to remove and trap particulates of diameter larger than 1–10 micrometers dispersed in ambient air, said particle-generating means sealingly connected upstream of said filtration means, d. said exhaust air transfer port adapted to mount an optional charged-particle generator inside said housing whereby a physiologically-safe level of charged particles and ions is added to the air being discharged, f. internal, ducted, electric, rotary air-circulation means of controllable, variable flow volume in the range 1–10 m3/min of ambient air sealingly connected downstream of said filtration means, g. an enclosed cooling means, heat absorber-1, sealingly connected downstream to said exhaust port and upstream to said air-circulation means, containing a plurality of cooled, spaced-apart, extended-area, dew-forming surfaces sealingly connected to receive particle-free air from said air-circulation means adapted to cool the boundary-lay air adjacent to said dew-forming surfaces to a temperature at least 1–10 deg. C. below the equilibrium dewpoint of the inlet air stream, thereby forming liquid-water on said dew-forming surfaces, said surfaces being formed and positioned for gravity flow of said liquid water into a removably-attached, enclosed dripoff collection vessel, h. enclosed fluid-reservoir means of volume in the range 1–10 liters, sealingly connected to said dripoff collection vessel of said heat absorber-1, said reservoir being formed using welding techniques and materials appropriate for storage vessels for high-purity drinking water and fitted with a outlet connection whereby at least 90% of the water held therein can be pumped out, i. bacteriostat loop means sealingly connected to said fluid reservoir and fitted with a closed-loop, recirculation channel and pump whereby water in said reservoir is pumped at a predetermined flow rate through an activated-carbon porous filter-absorber connected in series with a UV treatment zone where it is continually exposed to radiation of sufficient energy and appropriate wavelength to kill adventitious bacteria and viruses, and j. pressurized delivery channel sealingly connected to said closed-loop channel and extending through one of said vertical panels to an external dispensing valve whereby opening said external dispensing valve by a user allows delivery of a controlled amount of purified water from said reservoir, wherein said enclosure and all subsystems are interconnected with a networked array of failsafe sensors and alarms which continually verifies integrity, function and operation of each component within predetermined pressure, temperature, and flow-rate control limits, and if excessive deviations are measured, the entire generator is shut down and no water can be dispensed.

2. The water-recovery system of claim 1 provided with:
an additional means located within said enclosure and connected to said recirculation channel for providing, holding and dispensing chilled, purified water at a predetermined temperature range of 5–15 deg. C. to a separate, cold-water spigot valve and
an additional enclosed holder-dispenser, mounted external to said enclosure, for disposable, cold-fluid drinking cups.

3. The water-recovery system of claim 2 provided with: additional means located within said enclosure and connected to said recirculation channel for providing, holding and dispensing heated, purified water at a predetermined temperature of 60–80 deg. C. to a separate hot-water spigot valve and an additional enclosed holder-dispenser, mounted external to said enclosure, for disposable, hot-fluid drinking cups.

4. The water-recovery system of claim 3, wherein:

(a) said heat absorber-1 includes a closed-system compression-refrigeration unit filled with an EPA-compliant refrigerant, said unit also being fitted with an upstream, electric-resistance air-heater, which is automatically regulated by thermal sensors located in the air downstream of heat absorber-1, to prevent formation of ice on extended cooling surfaces of said heat absorber-1, (b) said heat absorber-1 is adapted to cool a flowing stream of filtered air to at least a temperature below its dew point using a temperature-controlled flow of said boiling refrigerant in one or more closed channels thermally connected to an array of extended-surface elements located in said air stream, (c) said heat absorber-1 is maintained in an ice-free state below dew point temperature of said air stream by automatic, controlled heating of incoming air using said upstream electric-resistance air-heater, (d) said additional means of providing and holding cooled water is a temperature-controlled, auxiliary evaporator of said closed-system, compression-refrigeration unit located in thermal contact with the bottom surface of a thermally-insulated, closed reservoir vessel also fitted with a horizontally-oriented, fluid-convection-inhibiting, thermal-insulating, separator baffle, located vertically above said reservoir bottom surface, adapted to trap cold water below said baffle, (e) said additional means of providing and holding heated water is a separate reservoir fitted with thermostatically-controlled electric-resistance heating elements in thermal contact with said reservoir walls and enclosed in an efficient thermal-insulating shell, and (f) said dispensing valves for ambient, hot and cold water are located at a height of 0.8 to 1.6 m above the base plane upon which said wheeled enclosure is situated.

5. A process for preparing and dispensing EPA-compliant primary drinking water by condensation of moisture from ambient air carried out within a closed, wheeled housing comprising the steps of:

a. removing particulate contaminants from ambient air by drawing a flowing stream through an enclosed channel fitted with electrostatic particle separators and particle filters, b. cooling the stream of particle-free air from step a. by closed-system, forced convection across a plurality of chemically-inert, dew-forming surfaces in a heat absorber to at least 3 deg. C. below its equilibrium dew point temperature, c. allowing liquid water formed on said cooled, dew-forming surfaces to flow under gravitational forces to a predetermined, enclosed dew-dripoff collection zone, d. collecting said dripoff liquid water into an enclosed receptacle, e. continually circulating said collected liquid water through an enclosed bacteriostat treatment loop wherein any extant microorganisms are killed and any absorbable dissolved or dispersed contaminants are removed by activated-carbon filtration, and f. dispensing water to an external location from a branch line connected to said treatment loop by manual operation of a remote dispensing valve, wherein all said process steps (a)–(f) are accomplished under continuous monitoring by an array of sensors interconnected to a failsafe, control system adapted to disable water dispensing should the integrity of said housing be breached or the regulation of each of said steps fall outside predetermined control limits for temperature and flow rate, wherein all said steps (a)–(f) are accomplished by electrically-powered subsystems mounted within an upright, wheeled enclosure, all seams and openings of said enclosure being fitted with barriers and seals to repel and prevent entry of insects and airborne contaminants, wherein said remote dispensing valve is external to said enclosure and located at a height of 0.8 to 1.6 m above the base plane upon which said wheeled enclosure is situated, and whereby impurities detectable in said dispensed water are below levels allowed by EPA for primary drinking water.

6. The process for preparing and dispensing EPA-compliant primary drinking water of claim 5, further comprising two additional steps following step (f):

(g) cooling, holding and dispensing of chilled water, in the temperature range of 5–15 C., to an external location, and (h) heating, holding and dispensing of heated water, in the temperature range of 60–80 C., to an external location.

* * * * *

UNITED STATES PATENT AND TRADEMARK OFFICE
Certificate

Patent No. 5,669,221                                                Patented: September 23, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Terry L. Lebleu, Francis C. Forsberg and Stephen M. Lebleu.

Signed and Sealed this Twenty-Ninth Day of June, 1999.

<div align="right">

HENRY A. BENNETT
*Supervisory Patent Examiner*
Art Unit 3700

</div>